United States Patent
Kikuma et al.

(10) Patent No.: US 10,108,078 B2
(45) Date of Patent: Oct. 23, 2018

(54) PROJECTION-TYPE IMAGE DISPLAY DEVICE

(71) Applicant: JVC KENWOOD Corporation, Yokohama-shi, Kangawa (JP)

(72) Inventors: Shinji Kikuma, Yokohama (JP); Takatsugu Aizaki, Yokohama (JP); Yasuki Arihara, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/671,186

(22) Filed: Aug. 8, 2017

(65) Prior Publication Data
US 2018/0074391 A1 Mar. 15, 2018

(30) Foreign Application Priority Data

Sep. 13, 2016 (JP) ................................. 2016-178515

(51) Int. Cl.
| | |
|---|---|
| *G03B 21/20* | (2006.01) |
| *F21V 9/30* | (2018.01) |
| *F21V 9/08* | (2018.01) |
| *F21V 14/08* | (2006.01) |
| *G02B 27/14* | (2006.01) |
| *G03B 33/12* | (2006.01) |

(52) U.S. Cl.
CPC .............. *G03B 21/206* (2013.01); *F21V 9/08* (2013.01); *F21V 9/30* (2018.02); *F21V 14/08* (2013.01); *G02B 27/141* (2013.01); *G03B 21/204* (2013.01); *G03B 33/12* (2013.01); *G03B 21/2073* (2013.01)

(58) Field of Classification Search
CPC G03B 21/2033; G03B 27/141; G02B 26/007; G02B 27/141

USPC ....................................................... 353/31, 20
See application file for complete search history.

(56) References Cited

U.S. PATENT DOCUMENTS

| | | | | |
|---|---|---|---|---|
| 2011/0310363 | A1* | 12/2011 | Kita | G03B 21/204 353/98 |
| 2012/0154767 | A1* | 6/2012 | Kimura | H04N 9/315 353/98 |
| 2014/0111967 | A1* | 4/2014 | Rehn | F21V 9/10 362/84 |

FOREIGN PATENT DOCUMENTS

JP        2012-108486 A      6/2012

\* cited by examiner

*Primary Examiner* — Steven H Whitesell Gordon
*Assistant Examiner* — Jerry Brooks
(74) *Attorney, Agent, or Firm* — Nath, Goldberg & Meyer; Jerald L. Meyer

(57) ABSTRACT

A projection-type image display device includes a light source, a phosphor, a filter, and a filter driver. The light source emits blue illumination light. The phosphor generates yellow illumination light, which includes red illumination light and green illumination light from a part of the blue illumination light, and reflects the blue illumination light and the yellow illumination light. The filter reflects the blue illumination light, which is reflected by the phosphor, toward the phosphor, and transmits the yellow illumination light therethrough. The filter driver controls the reflection amount of the blue illumination light toward the phosphor by controlling the insertion amount of the filter onto the optical path of the blue illumination light. The phosphor generates yellow illumination light also from the blue illumination light reflected by the filter.

5 Claims, 8 Drawing Sheets

FIG. 6

| | REFLECTION AMOUNT OF BLUE ILLUMINATION LIGHT Bb BY FILTER 100 | GAIN OF BLUE IMAGE SIGNAL | DISPLAY IMAGE | |
| --- | --- | --- | --- | --- |
| | | | COLOR TEMPERATURE | BRIGHTNESS |
| (a) | 0% | 100% | 7500K | 100% |
| (b) | 20% | 100% | 6500K | 100% |
| (c) | 40% | 100% | 5500K | 95% |
| (d) | 0% | 70% | 6500K | 95% |
| (e) | 0% | 55% | 5500K | 90% |

PROJECTION-TYPE IMAGE DISPLAY DEVICE

CROSS REFERENCE TO RELATED APPLICATION

This application is based upon and claims the benefit of priority under 35 U.S.C. § 119 from Japanese Patent Application No. 2016-178515, filed on Sep. 13, 2016, the entire contents of which are incorporated herein by reference.

BACKGROUND

The present disclosure relates to a projection-type image display device.

In a projection-type image display device, a blue laser light source and a phosphor are used as illumination light sources, for example. A blue light image is generated by using the blue laser light source as the illumination light source. A red light image and a green light image are generated by using a phosphor as the illumination light source.

Specifically, the phosphor is irradiated with a laser beam from the blue laser light source, and thereby converts energy of the received laser beam into yellow light with a wavelength band, including a red band and a green band. Japanese Unexamined Patent Application Publication No. 2012-108486 (Patent Document 1) describes a projection-type image display device using the blue laser light source and the phosphor as illumination light sources.

SUMMARY

Typically, the projection-type image display device includes: a blue image display element, a green image display element, and a red image display element. The blue image display element optically modulates blue illumination light, which is emitted from the blue laser light source based on a blue image signal inputted thereto, and generates a blue light image. The green image display element optically modulates green illumination light, which is color-separated from the yellow light generated by the phosphor based on a green image signal inputted thereto, and generates a green light image. The red image display element optically modulates red illumination light, which is color-separated from the yellow light generated by the phosphor based on a red image signal inputted thereto, and generates a red light image.

It is preferable that the projection-type image display device is capable of adjusting the color temperature of the display image in accordance with image data to be inputted or by a user's preference, or in order to adjust variations in color temperature for each projection-type image display device. Accordingly, in the projection-type image display device as described in Patent Document 1, in a case of adjusting the color temperature to be lowered, measures are taken such that a gain of the blue image signal is lowered, or that the blue illumination light is dimmed by using a dimmer filter. However, if the gain of the blue image signal is lowered, or the blue illumination light is dimmed by using the dimmer filter, then brightness of the display image is decreased.

An aspect of the embodiment provides a projection-type image display device including: a light source configured to emit blue illumination light; a phosphor configured to generate yellow illumination light from a part of the blue illumination light, the yellow illumination light including red illumination light and green illumination light, and to reflect the blue illumination light and the yellow illumination light; a filter configured to reflect the blue illumination light reflected by the phosphor toward the phosphor, and to transmit the yellow illumination light therethrough reflected by the phosphor; and a filter driver configured to control a reflection amount of the blue illumination light toward the phosphor by controlling an insertion amount of the filter onto an optical path of the blue illumination light, wherein the phosphor generates yellow illumination light also from the blue illumination light reflected by the filter.

BRIEF DESCRIPTION OF THE DRAWINGS

FIG. 6 is a table showing a relationship between a reflection amount of the blue illumination light by the filter and a color temperature and brightness of a display image.

DETAILED DESCRIPTION

First Embodiment

Figure 1:
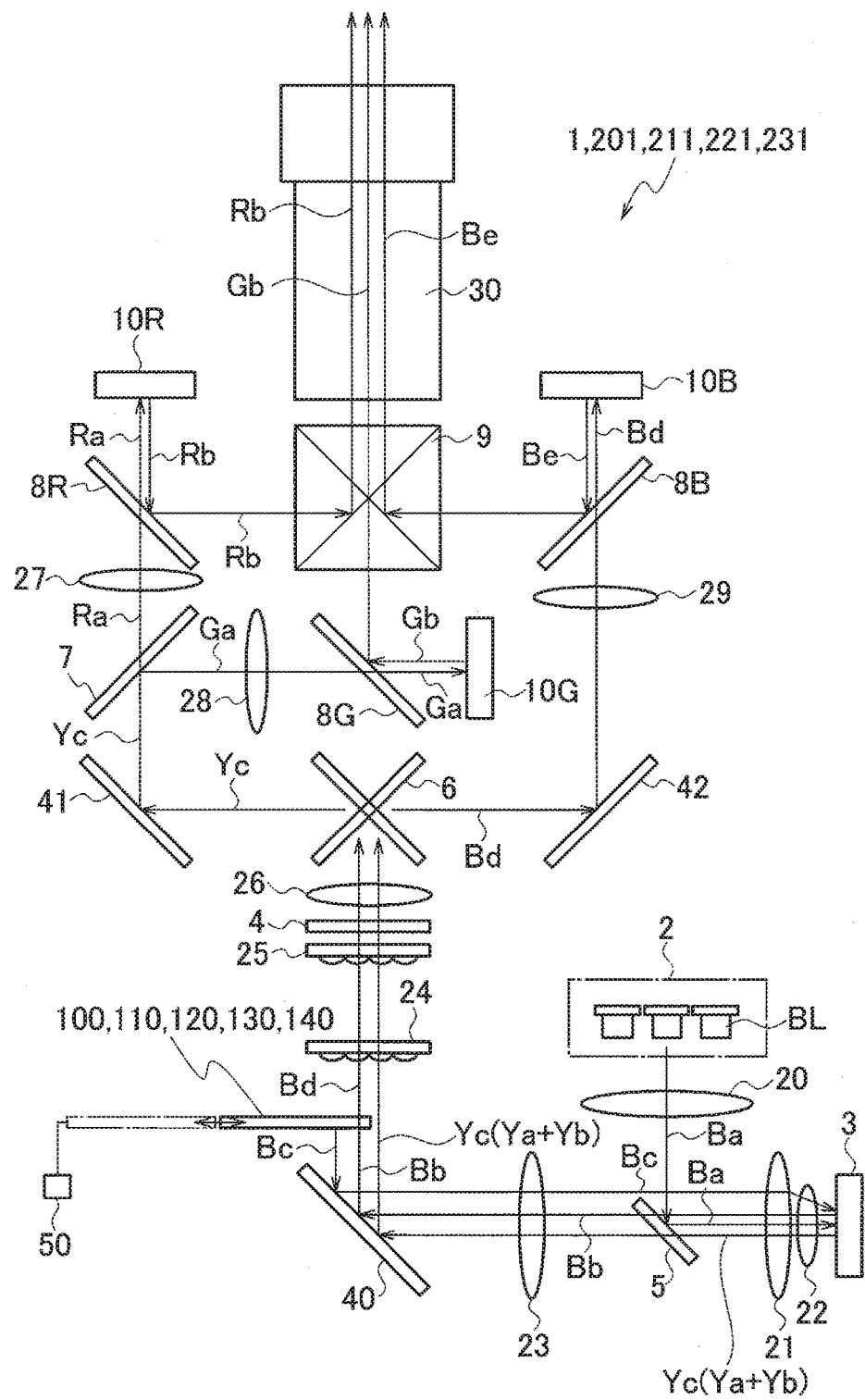
FIG. 1 is a configuration diagram showing a projection-type image display device according to the first to fifth embodiments.

By using FIG. 1 to FIG. 6, a description will be made of a projection-type image display device according to the first embodiment. FIG. 1 shows an overall configuration of the projection-type image display device according to the first embodiment.

As shown in FIG. 1, a projection-type image display device 1 includes: a light source 2; a phosphor 3; a polarization conversion system (PCS) 4; dichroic mirrors 5 to 7; reflection-type polarization plates 8R, 8B, and 8G; and a color combining prism 9. Moreover, the projection-type image display device 1 includes: a red image display element 10R, a green image display element 10G, and a blue image display element 10B; lenses 20 to 30; reflection mirrors 40 to 42; a filter 100; and a filter driver 50.

The light source 2 (blue laser element BL) and the phosphor 3 compose an illumination light source. For example, the light source 2 is composed of a laser array in which a plurality of the blue laser elements BL are arrayed. The light source 2 emits blue illumination light that is a blue laser beam. Condenser lenses 20, 21, and 22 condense the blue illumination light that is incident light.

The phosphor 3 includes a fluorescent layer, which generates yellow illumination light including a component of a red band and a component of a green band, both of the components having intensity corresponding to intensity of energy of light irradiated from the light source 2, specifically, intensity of energy of a part of the blue illumination light irradiated from the light source 2. Moreover, the phosphor 3 has a reflective surface that reflects the yellow illumination light and the blue illumination light, which have transmitted through the fluorescent layer. The dichroic mirror 5 reflects the blue illumination light, and transmits the yellow illumination light therethrough. The collimator lens 23 converts the incident light into parallel light.

Figure 2:
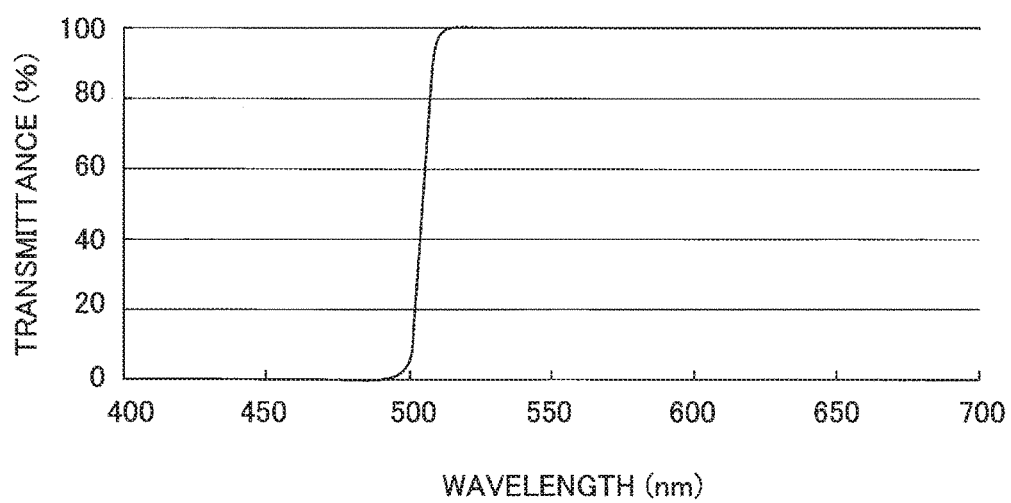
FIG. 2 is a spectral transmittance characteristic chart of a filter of the projection-type image display device according to the first to fifth embodiments.

The filter 100 is disposed so as to be freely-insertable into and retractable from the optical path of the blue illumination light and the yellow illumination light between the reflection mirror 40 and the fly-eye lens 24. The filter 100 has spectral transmittance characteristics shown in FIG. 2. An axis of ordinates represents transmittance (%), and an axis of abscissas represents a wavelength (nm). As shown in FIG. 2, transmittance of the filter 100 in the blue wavelength range is 0%, that is, the reflectance thereof in the blue wavelength range is 100%.

The filter 100 is a predetermined wavelength band reflection filter that reflects the blue illumination light toward the phosphor 3 and transmits the yellow illumination light therethrough. Desirably, the filter 100 is disposed at an arbitrary position on the optical path where the blue illumination light and the yellow illumination light become parallel light, the optical path being located between the collimator lens 23 and the lens 26.

Figure 3:
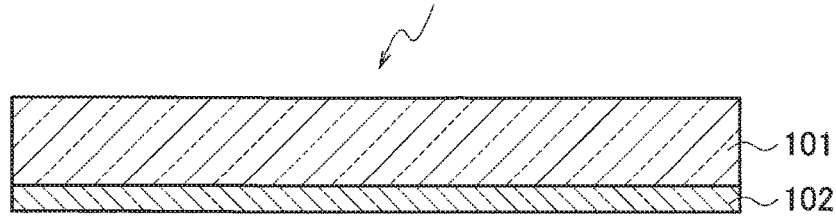
FIG. 3 is a cross-sectional view schematically showing the filter of the projection-type image display device according to the first to fifth embodiments.

FIG. 3 schematically shows a cross section of the filter 100. The filter 100 includes: a transparent substrate 101 such as a glass substrate; and a dielectric multilayered film 102 formed on the incident surface side or the emission surface side of the transparent substrate 101. The dielectric multilayered film 102 is a multilayered film in which high-refractive-index dielectric films and low-refractive-index dielectric films are laminated alternately with each other. The dielectric multilayered film 102 reflects the blue illumination light, and transmits the yellow illumination light therethrough.

By materials, film thicknesses, number of layers and the like of the respective dielectric films in the dielectric multilayered film 102, the reflectance of the blue illumination light can be set to a desired value. Note that an antireflection film for lowering the reflectance of the yellow illumination light may be formed on the surface (for example, the emission surface) of the transparent substrate 101, which is opposite to the surface (for example, the incident surface) on which the dielectric multilayered film 102 is formed.

The filter driver 50 controls an insertion amount of the filter 100 onto the optical path of the blue illumination light and the yellow illumination light, retracts the filter 100 from the optical path, and so on. A motor may be used as the filter driver 50. Note that a configuration of the filter 100 and a method for controlling the insertion amount of the filter 100 onto the optical path of the blue illumination light and the yellow illumination light by the filter driver 50 will be described later.

The fly-eye lenses 24 and 25 equalize illumination distributions of the blue illumination light and the yellow illumination light (including the red illumination light and the green illumination light), which are incident thereonto. In this way, the illumination distributions of the red illumination light irradiated to the red image display element 10R, the green illumination light irradiated to the green image display element 10G, and the blue illumination light irradiated to the blue image display element 10B, can be equalized.

The PCS 4 aligns such pieces of the blue illumination light and the yellow illumination light, which are incident thereonto, to the p-polarization. The cross dichroic mirror 6 separates the blue illumination light and the yellow illumination light from each other, which are incident thereonto. The dichroic mirror 7 separates the light, which is incident thereonto, by reflection and transmittance while taking a separation wavelength as a separation boundary.

Specifically, for the yellow illumination light thus made incident, the dichroic mirror 7 reflects the green illumination light, transmits the red illumination light therethrough, and thereby separates the green illumination light and the red illumination light from each other. Here, with regard to the reflectance of the green illumination light and the transmittance of the red illumination light, while taking the separation wavelength as a boundary, the reflectance becomes 100% on the short wavelength side, and the transmittance becomes 100% on the long wavelength side.

In the wavelength around the separation wavelength, the reflectance of the green illumination light and the transmittance of the red illumination light become small, and accordingly, it can be said that the width having the separation wavelength as the center is present on the separation boundary. By this width of the separation boundary, the component of the green wavelength band is included in the red illumination light, and the component of the red wavelength band is included in the green illumination light. From the viewpoint of utilization efficiency of light energy, it is ideal that no width of the separation boundary is present.

The reflection-type polarization plates 8R, 8G, and 8B reflect the s-polarization and transmit the p-polarization therethrough. For example, the reflection-type polarization plates 8R, 8G, and 8B can be composed of wire grids.

The red image display element 10R is a red image-purpose optical modulator for optically modulating the irradiated red illumination light to generate red image light based on a red image signal that is image data of a red component. The green image display element 10G is a green image-purpose optical modulator for optically modulating the irradiated green illumination light to generate green image light based on a green image signal that is image data of a green component. The blue image display element 10B is a blue image-purpose optical modulator for optically modulating the irradiated blue illumination light to generate blue image light based on a blue image signal that is image data of a blue component.

The color combining prism 9 reflects the blue image light and the red image light, transmits the green image light therethrough, and combines the red image light, the green image light, and the blue image light with one another. The projection lens 30 enlarges and projects a display image of a full color image onto a screen and the like, the full color image being obtained in such a manner that the color combining prism 9 combines the red image light, the green image light, and the blue image light with one another.

By using FIG. 1 to FIG. 7, a description is made of a method for adjusting the color temperature of the display image by the insertion amount of the filter 100 onto the optical path of the blue illumination light and the yellow illumination light.

As shown in FIG. 1, the blue illumination light Ba emitted from the light source 2 is condensed by the condenser lens 20, and is reflected by the dichroic mirror 5. The blue illumination light Ba is further condensed by the condenser lenses 21 and 22, and is irradiated to the phosphor 3. The phosphor 3 converts energy of the irradiated blue illumination light Ba and generates yellow illumination light Ya of a fluorescence band including the red band and the green band.

The yellow illumination light Ya transmits through the condenser lenses 22 and 21 and the dichroic mirror 5, and is incident onto the collimator lens 23. Note that a part of the blue illumination light Ba irradiated to the phosphor 3 is reflected by the phosphor 3 without being converted into the yellow illumination light Ya, and is incident as blue illumination light Bb onto the collimator lens 23. The blue illumination light Bb and the yellow illumination light Ya become parallel light by the collimator lens 23, and are reflected toward the fly-eye lens 24 by the reflection mirror 40. Here, Bb represents a total amount of the blue illumination light being incident onto the filter 100.

A part of the blue illumination light Bb is reflected by a reflection amount corresponding to the insertion amount of the filter 100. The insertion amount of the filter 100 is controlled by the filter driver 50. A part of the blue illumination light Bb is reflected as blue illumination light Bc by the filter 100, and the other part of the blue illumination light Bb is emitted as blue illumination light Bd from the filter 100 and is incident onto the fly-eye lens 24. The blue illumination light Bc is reflected by the reflection mirror 40, and is irradiated to the phosphor 3 via the collimator lens 23 and the condenser lenses 21 and 22. Here, the blue illumination light Bc represents the total amount of the blue illumination light reflected from the filter 100. The blue illumination light Bd represents the total amount of the blue illumination light emitted from the filter 100.

The phosphor 3 converts energy of the irradiated blue illumination light Bc and generates yellow illumination light Yb of a fluorescence band including the red band and the green band. Hence, onto the fly-eye lens 24, there is made incident yellow illumination light Yc including: the yellow illumination light Ya generated by the blue illumination light Ba emitted from the light source 2; and the yellow illumination light Yb generated by the blue illumination light Bc that is return light from the filter 100. Here, a part of the blue illumination light Bc irradiated to the phosphor 3 is reflected by the phosphor 3 without being converted into the yellow illumination light Yb, is added to the blue illumination light Bb, and is incident onto the fly-eye lens 24.

Note that an irradiation area of the dichroic mirror 5 may be reduced in order to avoid a decrease of the blue illumination light Bc irradiated to the phosphor 3, the decrease being caused by the fact that the blue illumination light Bc is reflected on a surface of the dichroic mirror 5. In this case, the irradiation area is determined in consideration of a balance between efficiency at which the blue illumination light Ba is incident onto the phosphor 3 and efficiency at which the blue illumination light Bc is incident onto the phosphor 3, whereby conversion efficiency of the yellow illumination light Yc can be enhanced.

In the blue illumination light Bd and the yellow illumination light Yc, illumination distributions thereof are equalized by the fly-eye lenses 24 and 25. The blue illumination light Bd and the yellow illumination light Yc are aligned to the p-polarization by the PCS 4, and are incident onto the cross dichroic mirror 6 via the lens 26.

The blue illumination light Bd and the yellow illumination light Yc are color-separated from each other by the cross dichroic mirror 6. The yellow illumination light Yc is reflected by the reflection mirror 41, and is incident onto the dichroic mirror 7. The red illumination light Ra that is a component of the red band included in the yellow illumination light Yc and the green illumination light Ga that is a component of the green band included therein are color-separated by the dichroic mirror 7.

The red illumination light Ra transmits through the dichroic mirror 7, and is incident onto the reflection-type polarization plate 8R via the lens 27. The red illumination light Ra transmits through the reflection-type polarization plate 8R, and is incident onto the red image display element 10R. The red illumination light Ra is optically-modulated by the red image display element 10R, and is emitted as red image light Rb of the s-polarization. The red image light Rb is reflected by the reflection-type polarization plate 8R, and is incident onto the color combining prism 9.

The green illumination light Ga is reflected by the dichroic mirror 7, and is incident onto the reflection-type polarization plate 8G via the lens 28. The green illumination light Ga transmits through the reflection-type polarization plate 8G, and is incident onto the green image display element 10G. The green illumination light Ga is optically-modulated by the green image display element 10G, and is emitted as green image light Gb of the s-polarization. The green image light Gb is reflected by the reflection-type polarization plate 8G, and is incident onto the color combining prism 9.

The blue illumination light Bd is reflected by the reflection mirror 42, and is incident onto the reflection-type polarization plate 8B via the lens 29. The blue illumination light Bd transmits through the reflection-type polarization plate 8B, and is incident onto the blue image display element 10B. The blue illumination light Bd is optically-modulated by the blue image display element 10B, and is emitted as blue image light Be of the s-polarization. The blue image light Be is reflected by the reflection-type polarization plate 8B, and is incident onto the color combining prism 9.

The red image light Rb, the green image light Gb, and the blue image light Be, which are incident onto the color combining prism 9, are combined with one another by the color combining prism 9. The display image of the full color image, which is obtained in such a manner that the color combining prism 9 combines the red image light, the green image light, and the blue image light with one another, is enlarged and projected onto the screen and the like by the projection lens 30.

Figure 4A:
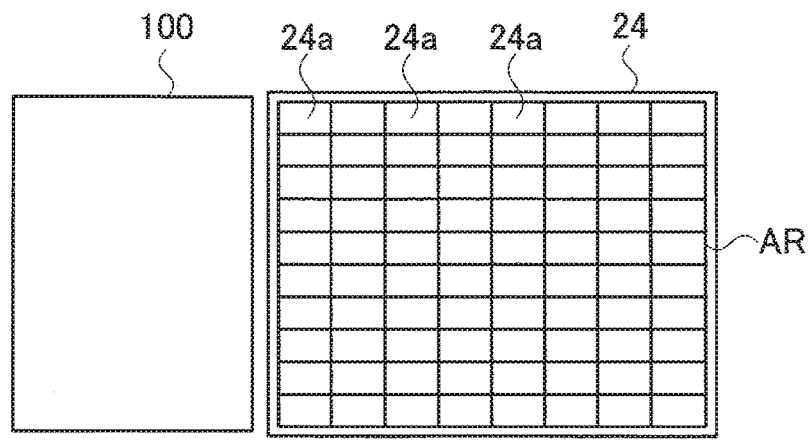
FIG. 4A is a diagram showing a state in which the filter and a fly-eye lens of the projection-type image display device according to the first embodiment are viewed from a reflection mirror side, and showing a filter-retracted state in which the filter is retracted from the fly-eye lens.
Figure 4B:
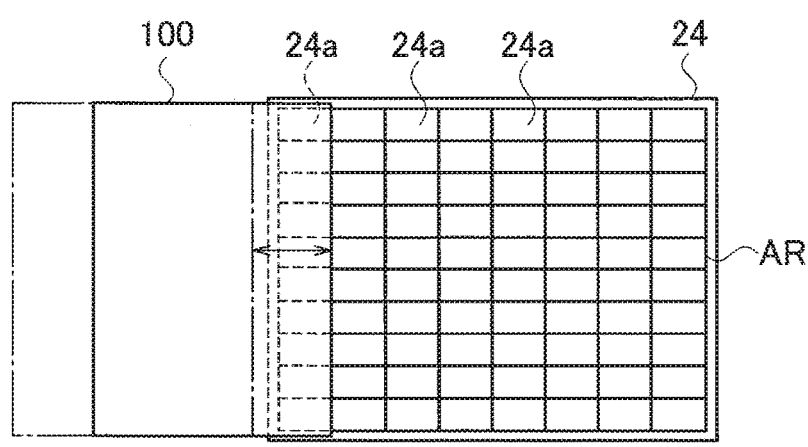
FIG. 4B is a view showing a state in which the filter and the fly-eye lens of the projection-type image display device according to the first embodiment are viewed from the reflection mirror side, and showing a first filter-inserted state in which the filter is inserted so as to overlap one column of cells of the fly-eye lens.
Figure 4C:
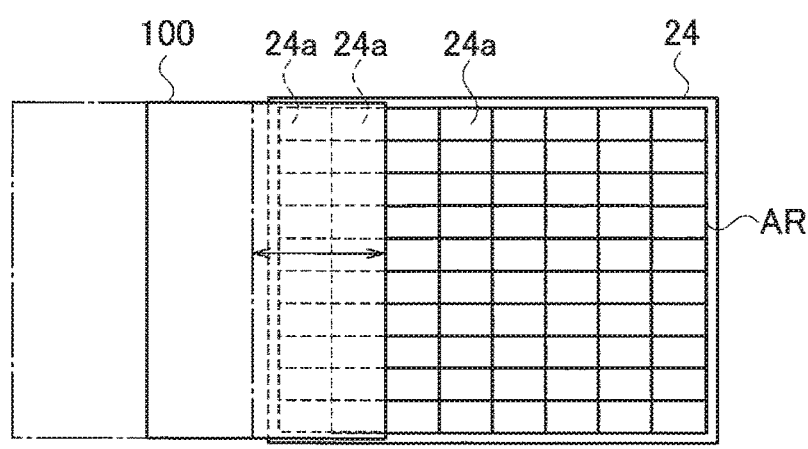
FIG. 4C is a view showing a state in which the filter and the fly-eye lens of the projection-type image display device according to the first embodiment are viewed from the reflection mirror side, and showing a second filter-inserted state in which the filter is inserted so as to overlap two columns of cells of the fly-eye lens.

FIGS. 4A to 4C show states in which the filter 100 and the fly-eye lens 24 are viewed from the reflection mirror 40 side. For example, the filter 100 has a rectangular outer shape. A plurality of lenses 24a are arranged in the fly-eye lens 24. A region where the plurality of lenses 24a are arranged is an illumination light irradiation region AR, to be irradiated with the yellow illumination light Ya and the blue illumination light Bb. Note that FIG. 4A to FIG. 4C show an example of a configuration in which the lenses 24a are arranged in a matrix in the horizontal direction and the vertical direction in order to simplify the explanation; however, the arrangement of the lenses 24a is not limited to this.

FIG. 4A shows a filter-retracted state in which the filter 100 is retracted from the optical path of the blue illumination light Bb and the yellow illumination light Ya. FIG. 4B shows a first filter-inserted state in which the filter 100 is inserted so as to shield a partial region of the optical path of the blue illumination light Bb and the yellow illumination light Ya, that is, a partial region of the illumination light irradiation region AR (specifically, the lenses 24a for one column of cells of the fly-eye lens 24). FIG. 4C shows a second filter-inserted state in which the filter 100 is inserted so as to shield a region wider than the region in the illumination light irradiation region AR, which is shown in FIG. 4B (specifically, the lenses 24a for two columns of cells of the fly-eye lens 24). The insertion amount of the filter 100 onto the optical path of the blue illumination light Bb and the yellow illumination light Ya is controlled by the filter driver 50.

Figure 5A:
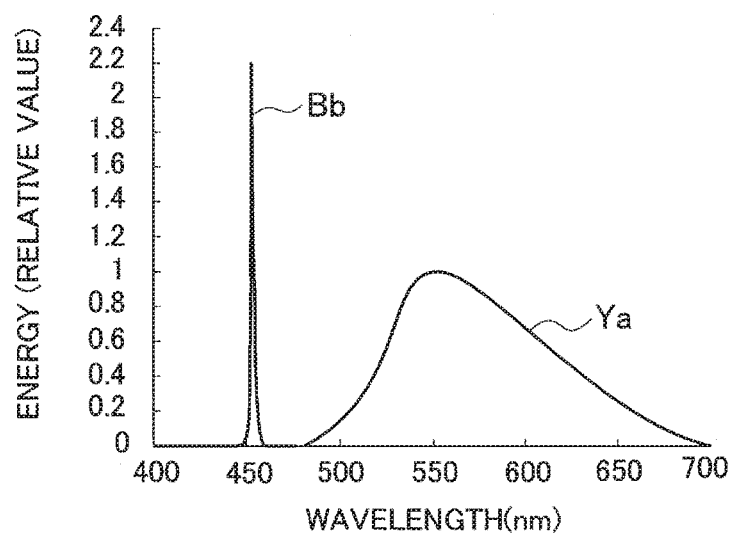
FIG. 5A is a spectral distribution diagram of blue illumination light and yellow illumination light, which are irradiated to the fly-eye lens in the filter-retracted state.
Figure 5B:
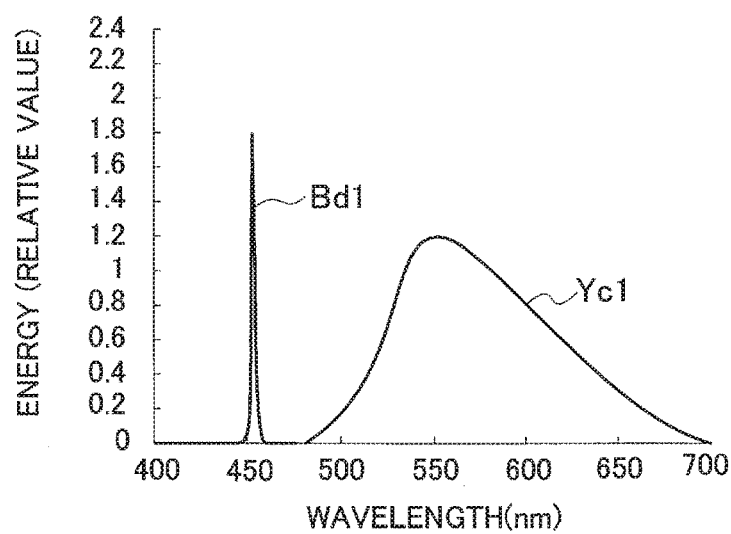
FIG. 5B is a spectral distribution diagram of blue illumination light and yellow illumination light, which are irradiated to the fly-eye lens in the first filter-inserted state.
Figure 5C:
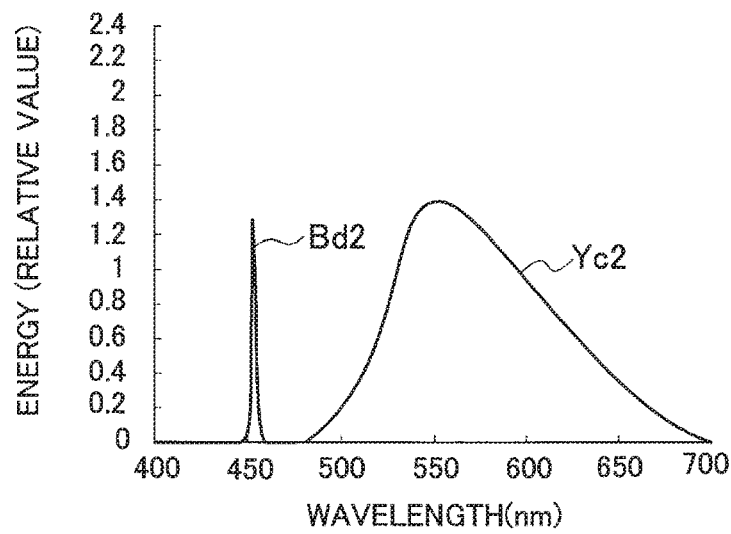
FIG. 5C is a spectral distribution diagram of blue illumination light and yellow illumination light, which are irradiated to the fly-eye lens in the second filter-inserted state.

FIGS. 5A to 5C show spectral distributions of the blue illumination light Bd and the yellow illumination light Yc, which are incident onto the fly-eye lens 24. An axis of ordinates represents energy (a relative value when a peak value of the yellow illumination light Ya is taken as 1), and an axis of abscissas represents a wavelength (nm). FIG. 5A, FIG. 5B, and FIG. 5C show the spectral distributions of the blue illumination light Bd and the yellow illumination light Yc in the filter-retracted state, the first filter-inserted state and the second filter-inserted state, respectively.

FIG. 6 shows a relationship between the reflection amount of the blue illumination light Bb by the filter 100 and the color temperature and brightness of the display image. Rows (a), (b), and (c) in FIG. 6 show the reflection amount of the blue illumination light Bb and the color temperature and brightness of the display image in the filter-retracted state, the first filter-inserted state, and the second filter-inserted state, respectively.

As shown in FIG. 4A, in the filter-retracted state, the reflection amount of the blue illumination light Bb by the filter 100 is 0%. That is, the blue illumination light Bb and the yellow illumination light Ya are incident onto the fly-eye lens 24. As shown in FIG. 5A, while the peak value of the yellow illumination light Ya is 1, the peak value of the blue illumination light Bb is approximately 2.2. As shown in row (a) in FIG. 6, the color temperature of the display image is 7500K, for example.

The blue illumination light Bb is a laser light, and accordingly, has a narrow wavelength band. Meanwhile, the yellow illumination light Ya is generated in such a manner that the blue illumination light Bb is converted by the phosphor 3, and accordingly, has a wide wavelength band including a red band and a green band, which have energy intensity corresponding to energy intensity of the blue illumination light Bb. The energy intensity of the blue illumination light Bb may be determined in consideration of conversion efficiency of the phosphor 3 and intensity of the light incident onto the optical modulator of each of the colors.

As shown in FIG. 4B, in the first filter-inserted state, a part of the blue illumination light Bb is reflected as the blue illumination light Bc by the filter 100, and the other part of the blue illumination light Bb is incident as the blue illumination light Bd onto the fly-eye lens 24. As shown in row (b) in FIG. 6, the reflection amount of the blue illumination light Bb by the filter 100 is 20%, for example.

The phosphor 3 is irradiated with the blue illumination light Bc, whereby the yellow illumination light Yb is generated. The yellow illumination light Yc including the yellow illumination light Ya and the yellow illumination light Yb is incident onto the fly-eye lens 24. Hence, the blue illumination light Bd1 and the yellow illumination light Yc1, which are shown in FIG. 5B, are incident onto the fly-eye lens 24. A part (Bc) of the blue illumination light Bb is reflected by the filter 100, and is converted into the yellow illumination light Yb by the phosphor 3, and accordingly, in comparison with the filter-retracted state, the peak value of the blue illumination light Bd1 decreases from approximately 2.2 to approximately 1.8, and the peak value of the yellow illumination light Yc1 increases from 1 to approximately 1.2.

A part of the blue illumination light Bb incident onto the filter 100 is reflected as the blue illumination light Bc, and accordingly, the blue illumination light Bd1 incident onto the fly-eye lens 24 has less energy than the blue illumination light Bb. Meanwhile, the yellow illumination light Yc1 incident onto the fly-eye lens 24 includes the yellow illumination light Ya and the yellow illumination light Yb, and accordingly, has higher energy than the yellow illumination light Ya.

That is, in comparison with the filter-retracted state, the brightness of the blue illumination light is reduced, and the brightness of the yellow illumination light is increased. Hence, as shown in row (b) of FIG. 6, in comparison with the filter-retracted state, the color temperature can be adjusted from 7500K to 6500K without reducing the brightness of the display image, for example.

Here, the filter driver 50 may control the insertion amount of the filter 100 while taking the width of the lenses 24a in the insertion direction as a minimum unit. That is, the lenses 24a may be shielded for every column step by step. Moreover, the insertion amount of the filter 100 may be controlled irrespective of the width of the lenses 24a.

As shown in FIG. 4C, in the second filter-inserted state, a part of the blue illumination light Bb is reflected as the blue illumination light Bc by the filter 100, and the other part of the blue illumination light Bb is incident as the blue illumination light Bd onto the fly-eye lens 24. As shown in row (c) in FIG. 6, the reflection amount of the blue illumination light Bb by the filter 100 is 40%, for example.

The phosphor 3 is irradiated with the blue illumination light Bc, whereby the yellow illumination light Yb is generated. The yellow illumination light Yc including the yellow illumination light Ya and the yellow illumination light Yb is incident onto the fly-eye lens 24. Hence, the blue illumination light Bd2 and the yellow illumination light Yc2, which are shown in FIG. 5C, are incident onto the fly-eye lens 24.

A part (Bc) of the blue illumination light Bb is reflected by the filter 100, and is converted into the yellow illumination light Yb by the phosphor 3, and accordingly, in comparison with the filter-retracted state, the peak value of the blue illumination light Bd2 decreases from approximately 2.2 to approximately 1.3, and the peak value of the yellow illumination light Yc2 increases from 1 to approximately 1.4. Hence, as shown in row (c) in FIG. 6, in comparison with the filter-retracted state, the brightness reduction of the display image is suppressed, and the color temperature can be adjusted from 7500K to 5500K, for example.

Row (d) in FIG. 6 is a first comparative example with row (b). Row (e) in FIG. 6 is a second comparative example with row (c).

As shown in row (a) in FIG. 6, in the filter-retracted state, the color temperature of the display image is 7500K. In the first comparative example, as shown in row (d) in FIG. 6, the gain of the blue image signal inputted to the blue image display element 10B is decreased to 70%, whereby the color temperature of the display image can be adjusted from 7500K to 6500K. Meanwhile, the brightness of the blue image light being optically-modulated by the blue image display element 10B is reduced by lowering the gain of the blue image signal. Therefore, as shown in row (d) in FIG. 6, the brightness of the display image decreases to 95%.

In contrast, in the projection-type image display device 1, as shown in row (b) in FIG. 6, the insertion amount of the filter 100 is controlled so that the reflection amount of the blue illumination light Bb can become 20%, and the first filter-inserted state is set, whereby the color temperature of the display image can be adjusted from 7500K to 6500K. In the projection-type image display device 1, apart (Bc) of the blue illumination light Bb is reflected by the filter 100, and is converted into the yellow illumination light Yb by the phosphor 3.

In this way, in the first filter-inserted state, the brightness of the yellow illumination light Yc increases as the brightness of the blue illumination light Bd decreases. Therefore, as shown in row (b) in FIG. 6, the brightness of the display image becomes 100%, which is not reduced.

In the second comparative example, as shown in row (e) in FIG. 6, the gain of the blue image signal inputted to the blue image display element 10B is decreased to 55%, whereby the color temperature of the display image can be adjusted from 7500K to 5500K. Meanwhile, the brightness of the blue image light being optically-modulated by the blue image display element 10B is reduced by lowering the gain of the blue image signal. Therefore, the brightness of the display image decreases to 90%.

In contrast, in the projection-type image display device 1, as shown in row (c) in FIG. 6, the insertion amount of the filter 100 is controlled so that the reflection amount of the blue illumination light Bb can become 40%, and the second filter-inserted state is set, whereby the color temperature of the display image can be adjusted from 7500K to 5500K. In the projection-type image display device 1, apart (Bc) of the blue illumination light Bb is reflected by the filter 100, and is converted into the yellow illumination light Yb by the phosphor 3.

In this way, the brightness of the blue illumination light Bd decreases, and the brightness of the yellow illumination light Yc increases. Therefore, as shown in row (c) in FIG. 6, the brightness of the display image becomes 95%, which is not lower than that (90%) of the second comparative example.

Hence, in accordance with the projection-type image display device 1 according to the first embodiment, the insertion amount of the filter 100 onto the optical path is controlled by the filter driver 50, whereby the reflection amount of the blue illumination light Bb can be controlled. The blue illumination light Bc reflected by the filter 100 is converted into the yellow illumination light Yb by the phosphor 3, and accordingly, the decrease in the brightness of the display image is suppressed, and the color temperature of the display image can be adjusted in response to the reflection amount of the blue illumination light Bb. It is desirable to control the insertion amount of the filter 100 onto the optical path based on the illumination distribution of the blue illumination light Bb irradiated to the fly-eye lens 24.

Second Embodiment

Figure 7:
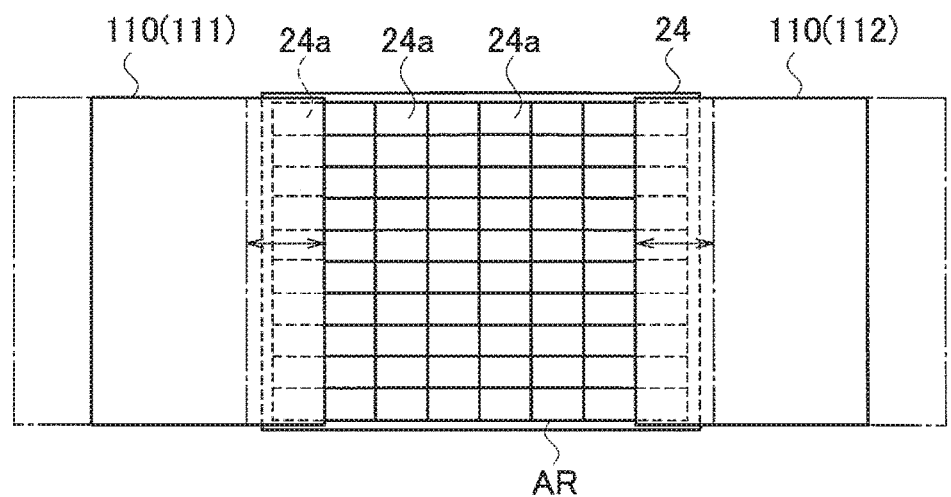
FIG. 7 is a diagram showing a state in which a filter and the fly-eye lens of the projection-type image display device according to the second embodiment are viewed from the reflection mirror side.

A projection-type image display device 201, according to the second embodiment and the projection-type image display device 1 according to the first embodiment, are different from each other in terms of the configuration of the filter 110, and are identical in terms of other configurations. Accordingly, a description is made of the configuration of the filter 110 by using FIG. 7. FIG. 7 shows a state in which the filter 110 and the fly-eye lens 24 are viewed from the reflection mirror 40 side. Note that, in order to simplify the explanation, the same reference numerals are assigned to the same constituents as to those of the first embodiment.

The filter 110 is disposed so as to be freely-insertable onto and retractable from the optical path between the reflection mirror 40 and the fly-eye lens 24. The filter 110 includes: a filter 111 to be inserted onto the optical path from one column side of the fly-eye lens 24; and a filter 112 to be inserted onto the optical path from other column side of the fly-eye lens 24. For example, the filters 111 and 112 have a rectangular outer shape.

The filter 111 and the filter 112 are movable in the direction of approaching each other and in the direction of being spaced apart from each other. Insertion amounts of the filters 111 and 112 are controlled by the filter driver 50. The filter driver 50 may control the filter 111 and the filter 112 to move in conjunction with each other, or may control the filter 111 and the filter 112 to be driven individually.

The filters 111 and 112 have the spectral transmittance characteristics shown in FIG. 2. The filters 111 and 112 are predetermined wavelength band reflection filters which reflect the blue illumination light toward the phosphor 3 and transmit the yellow illumination light therethrough. Desirably, the filters 111 and 112 are disposed at arbitrary positions on the optical path of the parallel light, which is located between the collimator lens 23 and the lens 26.

FIG. 3 schematically shows a cross section of each of the filters 111 and 112. Each of the filters 111 and 112 includes: the transparent substrate 101 such as a glass substrate; and the dielectric multilayered film 102 formed on the incident surface side or emission surface side of the transparent substrate 101. Note that an antireflection film for lowering the reflectance of the yellow illumination light may be formed on the surface (for example, the emission surface) of the transparent substrate 101, which is opposite to the surface (for example, the incident surface) on which the dielectric multilayered film 102 is formed.

As shown in FIG. 7, the filter 111 is inserted so as to shield the lenses 24a for one column on the left side of the fly-eye lens 24a. The filter 112 is inserted so as to shield the lenses 24a for one column on the right side of the fly-eye lens 24a. The state shown in FIG. 7 can obtain the same effect as that of the second filter-inserted state of the first embodiment. Note that, though FIG. 7 shows a configuration in which the filters 111 and 112 are disposed in the horizontal direction of the fly-eye lens 24, a configuration in which the filters 111 and 112 are disposed in the vertical direction of the fly-eye lens 24 may be adopted.

In accordance with the projection-type image display device 201 according to the second embodiment, the insertion amounts of the filters 111 and 112 onto the optical path are controlled by the filter driver 50, whereby the reflection amount of the blue illumination light Bb can be controlled. The blue illumination light Bc reflected by the filters 111 and 112 is converted into the yellow illumination light Yb by the phosphor 3, and accordingly, a decrease in the brightness of the display image is suppressed, and the color temperature of the display image can be adjusted in response to the reflection amount of the blue illumination light Bb. It is desirable to control the insertion amounts of filters 110 (111 and 112) onto the optical path based on the illumination distribution of the blue illumination light Bb irradiated to the fly-eye lens 24.

As in the second embodiment, the filters 110 are inserted onto the optical path while being caused to face each other, whereby a color distribution of the illumination light can be changed symmetrically with respect to the optical axis. In this way, a color distribution of the display image projected onto the screen and the like can be made less conspicuous. Moreover, there appears such an effect of narrowing the blue illumination light, and accordingly, the contrast of the blue illumination light can be enhanced.

Third Embodiment

Figure 8:
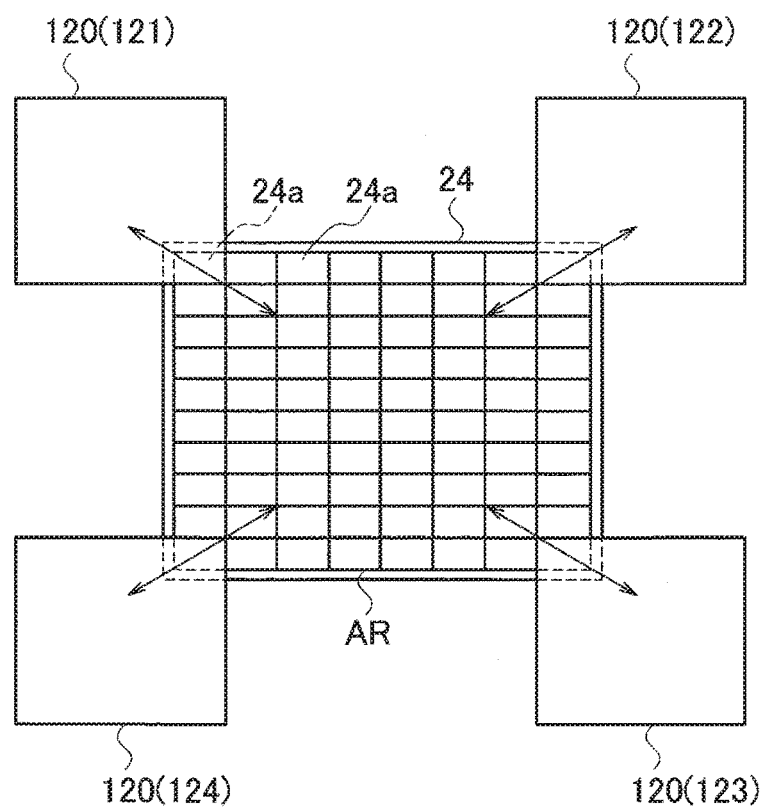
FIG. 8 is a diagram showing a state in which a filter and the fly-eye lens of the projection-type image display device according to the third embodiment are viewed from the reflection mirror side.

A projection-type image display device 211 according to the third embodiment and the projection-type image display devices 1 and 201 according to the first and second embodiments are different from each other in terms of the configuration of the filter 120, and are the same in terms of other configurations. Accordingly, a description is made of the configuration of the filter 120 by using FIG. 8. FIG. 8 shows a state in which the filter 120 and the fly-eye lens 24 are viewed from the reflection mirror 40 side. Note that in order to simplify the explanation, the same reference numerals are assigned to the same constituents as to those of the first and second embodiments.

The filter 120 is disposed so as to be freely-insertable onto and retractable from the optical path between the reflection mirror 40 and the fly-eye lens 24. The filter 120 includes four filters 121 to 124 disposed on four corners of the fly-eye lens 24. For example, the filters 121 to 124 have a rectangular outer shape.

The filter 121 and the filter 123 are disposed at one diagonal of the fly-eye lens 24, and are movable in a direction of approaching each other and in a direction of being spaced apart from each other. The filter 122 and the filter 124 are disposed at the other diagonal of the fly-eye lens 24, and are movable in a direction of approaching each other and in a direction of being spaced apart from each other.

Insertion amounts of the filters 121 to 124 are controlled by the filter driver 50. The filter driver 50 may control the filters 121 to 124 to move in conjunction with each other, or may control the filters 121 to 124 to be driven individually.

The filters 121 to 124 have the spectral transmittance characteristics shown in FIG. 2. The filters 121 to 124 are predetermined wavelength band reflection filters which reflect the blue illumination light toward the phosphor 3 and transmit the yellow illumination light therethrough. It is desirable that the filters 121 to 124 be disposed at arbitrary positions on the optical path of the parallel light, which is located between the collimator lens 23 and the lens 26.

FIG. 3 schematically shows a cross section of each of the filters 121 to 124. Each of the filters 121 to 124 includes: the transparent substrate 101 such as a glass substrate; and the dielectric multilayered film 102 formed on the incident surface side or emission surface side of the transparent substrate 101. Note that an antireflection film for lowering the reflectance of the yellow illumination light may be formed on a surface (for example, the emission surface) of the transparent substrate 101, which is opposite with a surface (for example, the incident surface) on which the dielectric multilayered film 102 is formed.

In accordance with the projection-type image display device 211 according to the third embodiment, the insertion amounts of the filters 121 and 124 onto the optical path are controlled by the filter driver 50, whereby the reflection amount of the blue illumination light Bb can be controlled. The blue illumination light Bc reflected by the filters 121 to 124 is converted into the yellow illumination light Yb by the phosphor 3, and accordingly, a decrease in the brightness of the display image is suppressed, and the color temperature of the display image can be adjusted in response to the reflection amount of the blue illumination light Bb. It is desirable to control the insertion amounts of such filters 120 (121 to 124) onto the optical path based on the illumination distribution of the blue illumination light Bb irradiated to the fly-eye lens 24.

As in the third embodiment, the filters are inserted from four corners onto the optical path, whereby the color distribution of the illumination light can be changed at a point symmetrical with respect to the optical axis. In this way, the color distribution of the display image projected onto the screen and the like can be made much less conspicuous.

Fourth Embodiment

Figure 9:
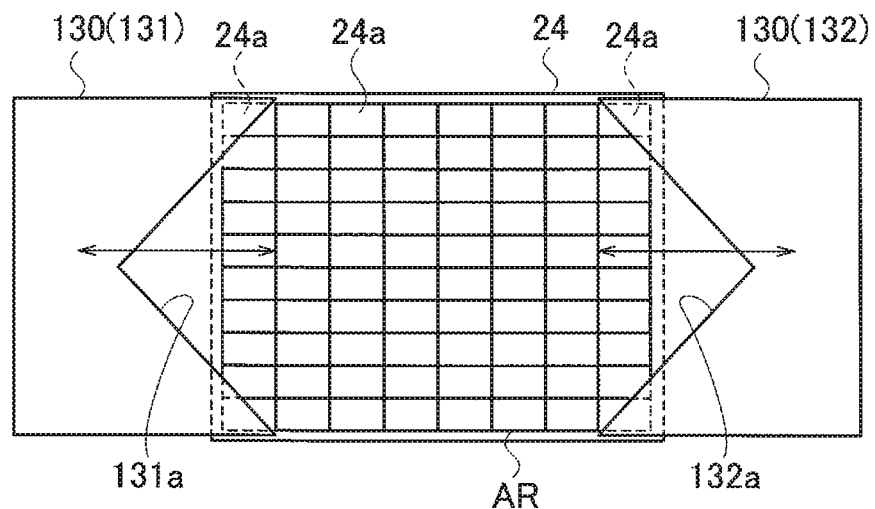
FIG. 9 is a diagram showing a state in which a filter and the fly-eye lens of the projection-type image display device according to the fourth embodiment are viewed from the reflection mirror side.

A projection-type image display device 221, according to the fourth embodiment and the projection-type image display devices 1, and 201 and 211 according to the first to third embodiments, are different from each other in terms of the configuration of the filter 130, and are the same in terms of other configurations. Accordingly, a description is made of the configuration of the filter 130 by using FIG. 9. FIG. 9 shows a state in which the filter 130 and the fly-eye lens 24 are viewed from the reflection mirror 40 side. Note that in order to simplify the explanation, the same reference numerals are assigned to the same constituents as those of the first to third embodiments.

The filter 130 is disposed so as to be freely-insertable onto and retractable from the optical path between the reflection mirror 40 and the fly-eye lens 24. The filter 130 includes: a filter 131 to be inserted onto the optical path from one column side of the fly-eye lens 24; and a filter 132 to be inserted onto the optical path from other column side of the fly-eye lens 24. The filters 131 and 132 have V-shaped notched portions 131a and 132a, each of which has two oblique sides at the tip end in the inserting direction of each of the filters 131 and 132.

It is preferable that an angle of one side of the V-shaped notched portions 131a and 132a, with respect to the horizontal direction of the fly-eye lens 24, is the same as the angle of the diagonal line with respect to the horizontal direction of the fly-eye lens 24.

The filter 131 and the filter 132 are movable in the direction of approaching each other and in the direction of being spaced apart from each other. Insertion amounts of the filters 131 and 132 are controlled by the filter driver 50. The filter driver 50 may control the filter 131 and the filter 132 to move in conjunction with each other, or may control the filter 131 and the filter 132 to be driven individually.

The filters 131 and 132 have the spectral transmittance characteristics shown in FIG. 2. The filters 131 and 132 are predetermined wavelength band reflection filters which reflect the blue illumination light toward the phosphor 3 and transmit the yellow illumination light therethrough. It is desirable that the filters 131 and 132 be disposed at arbitrary positions on the optical path of the parallel light, which is located between the collimator lens 23 and the lens 26.

FIG. 3 schematically shows a cross section of each of the filters 131 and 132. Each of the filters 131 and 132 includes: the transparent substrate 101 such as a glass substrate; and the dielectric multilayered film 102 formed on the incident surface side or emission surface side of the transparent substrate 101. Note that an antireflection film for lowering the reflectance of the yellow illumination light may be formed on a surface (for example, the emission surface) of the transparent substrate 101, which is opposite with a surface (for example, the incident surface) on which the dielectric multilayered film 102 is formed.

In accordance with the projection-type image display device 221 according to the fourth embodiment, the insertion amounts of the filters 131 and 132 onto the optical path are controlled by the filter driver 50, whereby the reflection amount of the blue illumination light Bb can be controlled. The blue illumination light Bc reflected by the filters 131 and 132 is converted into the yellow illumination light Yb by the phosphor 3, and accordingly, a decrease in the brightness of the display image is suppressed, and the color temperature of the display image can be adjusted in response to the reflection amount of the blue illumination light Bb. It is desirable to control the insertion amounts of such filters 130 (131 and 132) onto the optical path based on the illumination distribution of the blue illumination light Bb irradiated to the fly-eye lens 24.

In the fourth embodiment, the distribution of the illumination light of the plurality of lenses 24a, which is shielded by such oblique sides of the V-shaped notched portions 131a and 132a, is different for each lens. The illumination light is shielded by the oblique sides of the V-shaped notched portions 131a and 132a, whereby the illumination light emitted with a different distribution for each lens is superimposed, and a more uniform distribution of the illumination light can be obtained. In particular, the fourth embodiment is effective when the insertion amounts of the filters 130 are not controlled while taking the width of the lenses 24a in the insertion direction as a minimum unit, but the color temperature is desired to be changed continuously.

Fifth Embodiment

Figure 10:
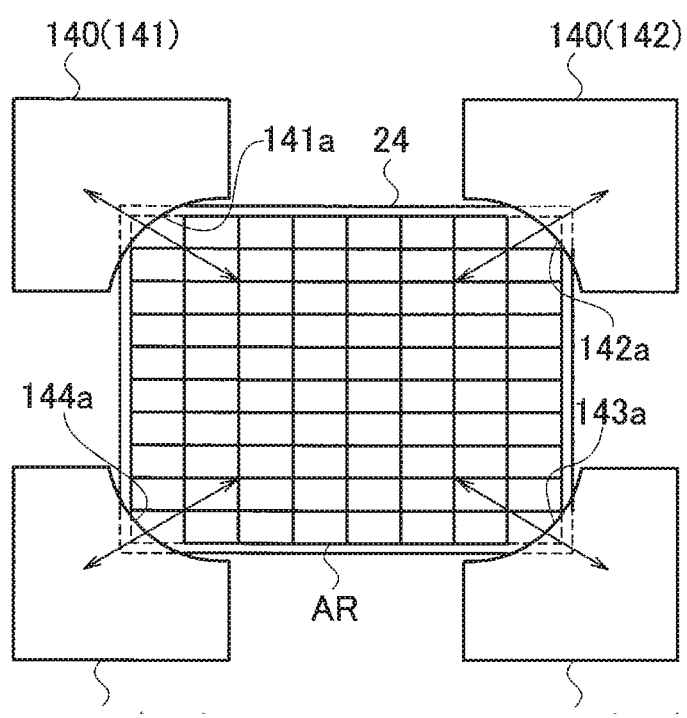
FIG. 10 is a diagram showing a state in which a filter and the fly-eye lens of the projection-type image display device according to the fifth embodiment are viewed from the reflection mirror side.

A projection-type image display device 231 according to the fifth embodiment and the projection-type image display devices 1, 201, 211, and 221 according to the first to fourth embodiments are different from each other in terms of the configuration of the filter 140, and are the same in terms of other configurations. Accordingly, a description is made of the configuration of the filter 140 by using FIG. 10. FIG. 10 shows a state in which the filter 140 and the fly-eye lens 24 are viewed from the reflection mirror 40 side. Note that in order to simplify the explanation, the same reference numerals are assigned to the same constituents as those of the first to fourth embodiments.

The filter 140 is disposed so as to be freely-insertable onto and retractable from the optical path between the reflection mirror 40 and the fly-eye lens 24. The filter 140 includes the four filters 141 to 144 disposed on the four corners of the fly-eye lens 24. The filters 141 to 144 have C-shaped notched portions 141a to 144a, each of which has a center of curvature on the center side of the fly-eye lens 24.

The filter 141 and the filter 143 are disposed at one diagonal of the fly-eye lens 24, and are movable in the direction of approaching each other and in the direction of being spaced apart from each other. The filter 142 and the filter 144 are disposed at the other diagonal of the fly-eye lens 24, and are movable in the direction of approaching each other and in the direction of being spaced apart from each other.

Insertion amounts of the filters 141 to 144 are controlled by the filter driver 50. The filter driver 50 may control the filters 141 to 144 to move in conjunction with one another, or may control the filters 141 to 144 to be driven individually.

The filters 141 to 144 have the spectral transmittance characteristics shown in FIG. 2. The filters 141 to 144 are predetermined wavelength band reflection filters which reflect the blue illumination light toward the phosphor 3 and transmit the yellow illumination light therethrough. It is desirable that the filters 141 to 144 be disposed at arbitrary positions on the optical path of the parallel light, which is located between the collimator lens 23 and the lens 26.

FIG. 3 schematically shows a cross section of each of the filters 141 to 144. Each of the filters 141 to 144 includes: the transparent substrate 101 such as a glass substrate; and the dielectric multilayered film 102 formed on the incident surface side or emission surface side of the transparent substrate 101. Note that an antireflection film for lowering the reflectance of the yellow illumination light may be formed on a surface (for example, the emission surface) of the transparent substrate 101, which is opposite with a surface (for example, the incident surface) on which the dielectric multilayered film 102 is formed.

In accordance with the projection-type image display device 231 according to the fifth embodiment, the insertion amounts of the filters 141 to 144 onto the optical path are controlled by the filter driver 50, whereby the reflection amount of the blue illumination light Bb can be controlled. The blue illumination light Bc reflected by the filters 141 to 144 is converted into the yellow illumination light Yb by the phosphor 3, and accordingly, a decrease in the brightness of the display image is suppressed, and the color temperature of the display image can be adjusted in response to the reflection amount of the blue illumination light Bb. It is desirable to control the insertion amounts of such filters 140 (141 to 144) onto the optical path based on the illumination distribution of the blue illumination light Bb irradiated to the fly-eye lens 24.

In the fifth embodiment, the distribution of the illumination light of the plurality of lenses 24a, which is shielded by such sides of the C-shaped notched portions 141a to 144a, is different for each lens. The illumination light is shielded by the sides of the C-shaped notched portions 141a to 144a, whereby the illumination light emitted with a different distribution for each lens is superimposed, and a more uniform distribution of the illumination light can be obtained. In particular, the fifth embodiment is effective when the insertion amounts of the filters 130 are not controlled while taking the width of the lenses 24a in the insertion direction as a minimum unit, but the color temperature is desired to be changed continuously.

[Reflectance of Filter]

In each of the projection-type image display devices 1, 201, 211, 221, and 231 according to the first to fifth embodiments, the reflectance of each of the filters 100, 110 (111 and 112), 120 (121 to 124), 130 (131 and 132), and 140 (141 to 144) for the blue illumination light Bb is set to 100% (transmittance of 0%); however, the reflectance is not limited to this.

In order to achieve a desired white balance (color temperature), it is desirable to set the reflectance of each of the filters 100, 110, 120, 130, and 140 to an appropriate value in response to the conversion efficiency of the phosphor 3, and the like. For example, the conversion efficiency of the phosphor varies depending on a type of phosphor, a temperature of the phosphor, a wavelength, power, spot diameter and the like of the blue illumination light irradiated to the phosphor.

A description is made of an example of a method of setting the reflectance of the filter 100 in the projection-type image display device 1 according to the first embodiment for the blue illumination light. Note that a similar setting method can also be used for the filters 110, 120, 130, and 140 in the projection-type image display devices 201, 211, 221, and 231 according to the second to fifth embodiments.

In an optical system in a state in which the filter 100 is retracted from the optical path or in a state corresponding thereto, there are measured: power of the blue illumination light Ba emitted from the light source 2; and power and spectral distribution of each of the blue illumination light Bb and the yellow illumination light Ya at the position at which the filter 100 is disposed, whereby the conversion efficiency of the phosphor 3 is calculated. The phosphor 3 is irradiated with the blue illumination light Ba while the power is being changed, and the power of the yellow illumination light Ya generated by the phosphor 3 is measured, whereby a correlation of the yellow illumination light Ya with the power of the blue illumination light Ba is calculated.

In the optical system in a state in which the filter 100 is inserted onto the optical path by a predetermined insertion amount or in a state corresponding thereto, the power and the spectral distribution are measured. The color temperature is calculated from a result of the measurement of the spectral distribution, and the reflectance for the blue illumination light, which is for obtaining a target color temperature, is calculated based on a result of the calculation. Note that power of the yellow illumination light Yb generated in such a manner that the phosphor 3 is irradiated with the blue illumination light Bc that is return light from the filter 100 differs depending on the optical system. Hence, in order to enhance accuracy of setting the reflectance, it is desirable that the measurement be performed in a state that is as similar as possible to that of an actual optical system.

The conversion efficiency of the phosphor 3 also varies depending on the power of the blue illumination light Ba emitted from the light source 2. Therefore, if the reflectance is set with the maximum power, then the reflectance will deviate from a target value at the minimum power. Accordingly, the reflectance is set with intermediate power in a settable range, whereby the deviation of the reflectance from the target value can be minimized over the entirety of the settable range. Note that, when recommended power is determined, the reflectance may be set with the recommended power.

Figure 11:
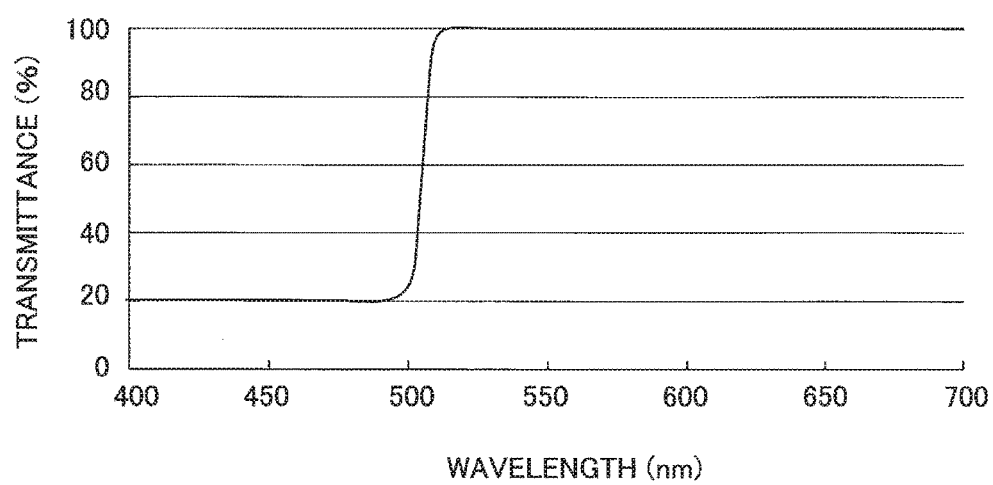
FIG. 11 is a spectral transmittance characteristic chart of the filter.

FIG. 11 shows spectral transmittance characteristics of the filter 100 when the reflectance in the blue wavelength range is set to 80% (transmittance of 20%). FIG. 11 corresponds to FIG. 2. Materials, film thicknesses, number of layers and the like of the respective dielectric films in the dielectric multilayered film 102 that composes the filter 100 are adjusted, whereby the reflectance of the filter 100 in the blue wavelength range can be set to a desired value.

If the reflectance of the filter 100 in the blue wavelength range is increased, the reflection amount of the blue illumination light can be increased even if the insertion amount is unchanged. In this way, the adjustment range of the color temperature can be widened. Meanwhile, if the reflectance of the filter 100 in the blue wavelength range is reduced, the reflection amount of the blue illumination light can be reduced even when the insertion amount is unchanged. In this way, the color temperature can be finely adjusted.

The present invention is not limited to the above-described first to fifth embodiments, and various modifications can be made without departing from the scope of the present invention.

What is claimed is:

1. A projection-type image display device comprising:
    a light source configured to emit blue illumination light;
    a phosphor configured to generate yellow illumination light from a part of the blue illumination light, the yellow illumination light including red illumination light and green illumination light, and to reflect the blue illumination light and the yellow illumination light;
    a filter configured to reflect the blue illumination light reflected by the phosphor toward the phosphor, and to transmit the yellow illumination light therethrough reflected by the phosphor; and
    a filter driver configured to control an insertion amount of the filter onto an optical path of the blue illumination light such that only a part of the blue illumination light is reflected by the filter, and to control a reflection amount of the blue illumination light toward the phosphor by controlling the insertion amount,
    wherein the phosphor generates yellow illumination light also from the blue illumination light reflected by the filter, and wherein the filter driver is further configured to adjust a color temperature of a display image by the projection-type image display device, such that the reflection amount of the blue illumination light toward the phosphor is controlled by controlling the insertion amount.

2. The projection-type image display device according to claim 1, wherein the filter is disposed on an optical path where the blue illumination light and the yellow illumination light become parallel light.

3. The projection-type image display device according to claim 1, wherein the filter comprises:
    a transparent substrate; and
    a dielectric multilayered film configured to reflect the blue illumination light at a predetermined reflectance, the dielectric multilayered film being formed on the transparent substrate.

4. The projection-type image display device according to claim 1, further comprising:
    a dichroic mirror configured to perform color separation for the yellow illumination light into the red illumination light and the green illumination light;

a red image display element configured to optically modulate the red illumination light, and to emit the optically-modulated red illumination light as red image light;

a green image display element configured to optically modulate the green illumination light, and to emit the optically-modulated green illumination light as green image light;

a blue image display element configured to optically modulate the blue illumination light, and to emit the optically-modulated blue illumination light as blue image light;

a color combining prism configured to combine the red image light, the green image light, and the blue image light with one another; and a projection lens configured to enlarge and project the display image of a full color image obtained by combining the red image light, the green image light, and the blue image light with one another, wherein the filter driver is configured to adjust the color temperature of the display image.

5. The projection-type image display device according to claim 2, further comprising a plurality of filters configured to reflect the blue illumination light reflected by the phosphor toward the phosphor, and to transmit the yellow illumination light therethrough reflected by the phosphor, wherein the filter driver controls the plurality of filters such that the plurality of filters are inserted onto the optical path symmetrically with respect to an optical axis from at least two directions.

* * * * *